J. O. WALKER.
DISINFECTANT DISTRIBUTER.
APPLICATION FILED APR. 2, 1908.
904,739.
Patented Nov. 24, 1908.
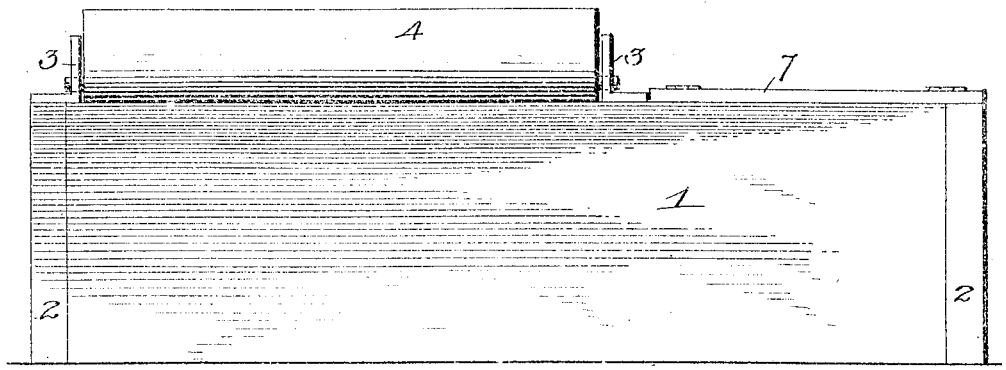
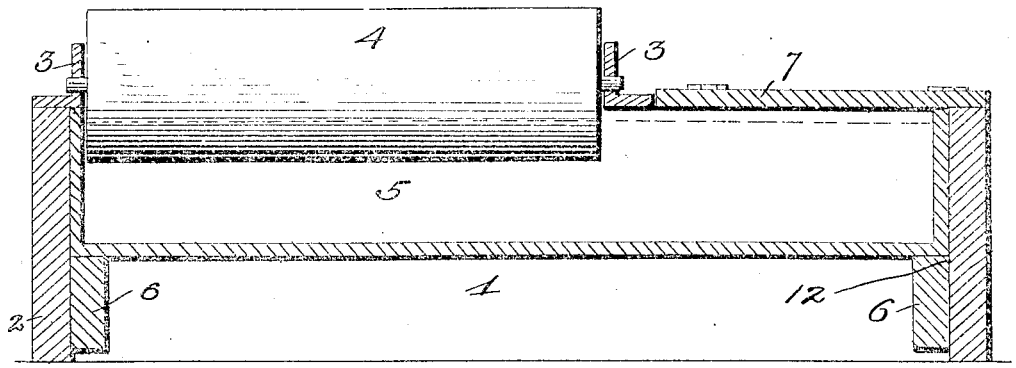
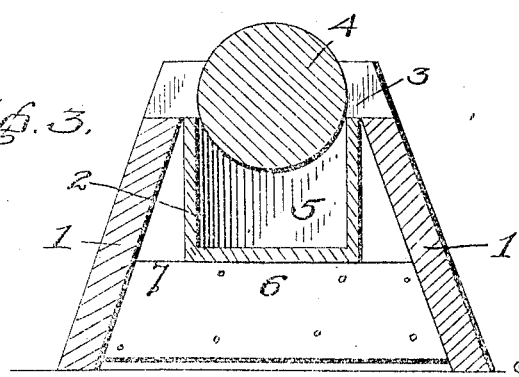

UNITED STATES PATENT OFFICE.

JAMES O. WALKER, OF BURLINGTON, IOWA.

DISINFECTANT-DISTRIBUTER.

No. 904,729.    Specification of Letters Patent.    Patented Nov. 24, 1908.

Application filed April 2, 1908. Serial No. 424,753.

*To all whom it may concern:*

Be it known that I, JAMES O. WALKER, a citizen of the United States, residing at Burlington, in the county of Des Moines and State of Iowa, have invented certain new and useful Improvements in Disinfectant-Distributers; and I do declare the following to be a full, clear, and exact description of the invention, such as will enable others skilled in the art to which it appertains to make and use the same.

This invention relates to an improved device for distributing and applying insecticides and disinfectants to the bodies of swine and other affected animals.

The object of the invention is to provide a device which is self-feeding and cheap to manufacture, and efficient and thorough in operation.

Heretofore it has been necessary to dip swine and other animals in a disinfecting and insecticidal dip to rid them of the parasites which are common to swine and other animals, and also from scabies. This process involved considerable time and labor, and frequently the dip had to be made of such strength (especially where lice were to be exterminated on hogs) that the animals were practically blinded for a considerable period after the operation.

This invention is designed to obviate all of these difficulties, and, broadly speaking, consists in a self-feeding roller which applies the disinfectant and insecticidal fluid to the affected parts of the animal as it rubs them against the roller.

With these and other objects in view, the invention consists of certain novel features of construction, combination and arrangement of parts as will be described and particularly pointed out in the appended claims.

In the accompanying drawings, Figure 1 is a side elevation; Fig. 2 is a longitudinal sectional view through the device; and Fig. 3 is a transverse sectional view thereof.

Referring more particularly to the drawings, 1 and 2 represent side members and end members, respectively, the former of which are sharply inclined so as to prevent the animals from climbing up the side and lying over the roller to obstruct its action on other animals which may desire to rub themselves. Attached to the upper edge of the sides 1 are bearing brackets, 3, in which the feeding and applying roller, 4, is journaled. This roller extends up above the top edge of the sides and depends into a tank, 5, secured in between the side and end members upon supporting batons, 6. A suitable door, 7, is hinged to one side of the device so that the tank may be refilled at any time.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a device of the class described, a pair of inverted V-shaped end members, sides attached to said end members and forming therewith an inclosing casing, a bracket secured to one of said ends, a bracket secured across the top of said sides, a feed tank supported on said end members, and a roller journaled in said brackets to rotate in said tank to distribute fluid.

2. In a device of the class described, a pair of inverted V-shaped end members, sides attached to said end members and forming therewith an inclosing casing, a bracket secured to one of said ends, a bracket secured across the top of said sides intermediate the end members, a feed tank supported on said end members, a roller journaled in said brackets to rotate in said tank for distributing fluid and to cover part of the tank, and a door hinged to one side and adapted to cover the remainder of the tank.

In testimony whereof I have hereunto set my hand in presence of two subscribing witnesses.

JAMES O. WALKER.

Witnesses:
ADELAIDE S. COOK,
THOMAS HEDGE.